(12) United States Patent
Pascoguin et al.

(10) Patent No.: US 8,988,539 B1
(45) Date of Patent: Mar. 24, 2015

(54) SINGLE IMAGE ACQUISITION HIGH DYNAMIC RANGE CAMERA BY DISTORTED IMAGE RESTORATION

(71) Applicants: Bienvenido Melvin L. Pascoguin, La Mesa, CA (US); Ryan P. Lu, San Diego, CA (US); Ayax D. Ramirez, Chula Vista, CA (US)

(72) Inventors: Bienvenido Melvin L. Pascoguin, La Mesa, CA (US); Ryan P. Lu, San Diego, CA (US); Ayax D. Ramirez, Chula Vista, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 69 days.

(21) Appl. No.: 14/039,103

(22) Filed: Sep. 27, 2013

(51) Int. Cl.
| | |
|---|---|
| H04N 5/225 | (2006.01) |
| H04N 13/02 | (2006.01) |
| H04N 9/09 | (2006.01) |
| H04N 9/097 | (2006.01) |
| H04N 5/235 | (2006.01) |
| H04N 5/232 | (2006.01) |

(52) U.S. Cl.
CPC ......... *H04N 5/2355* (2013.01); *H04N 5/23229* (2013.01)
USPC ........... 348/218.1; 348/49; 348/262; 348/265

(58) Field of Classification Search
CPC ............ H04N 5/2355; H04N 5/23229; H04N 5/23232; H04N 5/23235; H04N 9/09; H04N 9/097; H04N 9/10; H04N 9/11; H04N 3/1593; H04N 3/1587; H04N 2013/0088; H04N 5/3415; H04N 5/247; H04N 5/23238; G02B 27/10

USPC ........... 348/49, 262–265, E13.014, E13.015, 348/E13.032; 396/232–340
See application file for complete search history.

(56) References Cited

U.S. PATENT DOCUMENTS

| | | | | |
|---|---|---|---|---|
| 5,165,068 | A | * | 11/1992 | Baldwin ....................... 348/104 |
| 5,640,206 | A | * | 6/1997 | Kinoshita et al. ............. 348/264 |
| 5,692,226 | A | * | 11/1997 | Hall .............................. 396/326 |
| 5,726,709 | A | * | 3/1998 | Kinoshita et al. ............. 348/264 |
| 6,342,980 | B1 | * | 1/2002 | Omuro ........................... 359/834 |
| 6,590,679 | B1 | * | 7/2003 | Edgar et al. ................... 358/514 |
| 6,687,418 | B1 | | 2/2004 | Ludwig |
| 7,202,891 | B1 | * | 4/2007 | Ingram ...................... 348/224.1 |
| 7,423,679 | B2 | * | 9/2008 | Szajewski et al. ............. 348/308 |

(Continued)

OTHER PUBLICATIONS

McGuire, Morgan et al.; Optical Splitting Trees for High-Precision Monocular Imaging; Computational Photography, IEEE Computer Graphics and Applications; Mar. 2007.

(Continued)

*Primary Examiner* — Chia-Wei A Chen
(74) *Attorney, Agent, or Firm* — SPAWAR Systems Center Pacific; Kyle Eppele; J. Eric Anderson

(57) ABSTRACT

A method and camera for generating a high dynamic range (HDR) image comprising the following steps: receiving a first optical signal from a lens and generating a first output signal at a first image acquisition chip, wherein the first image acquisition chip is coated with a first partial reflection coating; reflecting the first optical signal off the first partial reflection coating to create a second optical signal such that the second optical signal has a lower intensity than the first optical signal; receiving the second optical signal and generating a second output signal at a second image acquisition chip; and combining the first and second output signals to create the HDR image.

20 Claims, 6 Drawing Sheets

(56) References Cited

U.S. PATENT DOCUMENTS

| | | | |
|---|---|---|---|
| 7,535,622 B2* | 5/2009 | Hewlett | 359/291 |
| 7,742,211 B2* | 6/2010 | Riley et al. | 359/32 |
| 8,784,301 B2* | 7/2014 | McDowall | 600/109 |
| 2002/0162973 A1* | 11/2002 | Cordingley et al. | 250/492.2 |
| 2005/0029458 A1* | 2/2005 | Geng et al. | 250/347 |
| 2005/0087829 A1* | 4/2005 | Merrill et al. | 257/440 |
| 2005/0093982 A1* | 5/2005 | Kuroki | 348/207.99 |
| 2005/0168746 A1* | 8/2005 | Ohtsuka | 356/445 |
| 2005/0200852 A1* | 9/2005 | Kimura | 356/445 |
| 2007/0081086 A1* | 4/2007 | Ingram | 348/262 |
| 2007/0115376 A1* | 5/2007 | Igarashi | 348/262 |
| 2007/0201738 A1* | 8/2007 | Toda et al. | 382/144 |
| 2008/0218851 A1* | 9/2008 | Chen et al. | 359/419 |
| 2008/0303927 A1* | 12/2008 | Khanh | 348/262 |
| 2009/0244717 A1* | 10/2009 | Tocci | 359/636 |
| 2010/0328780 A1* | 12/2010 | Tocci | 359/636 |
| 2011/0069189 A1* | 3/2011 | Venkataraman et al. | 348/218.1 |
| 2011/0200319 A1* | 8/2011 | Kravitz et al. | 396/333 |
| 2012/0001072 A1* | 1/2012 | Toda et al. | 250/339.05 |
| 2012/0200535 A1* | 8/2012 | Stienstra et al. | 345/175 |
| 2013/0194675 A1* | 8/2013 | Tocci | 359/636 |
| 2013/0319121 A1* | 12/2013 | Hill et al. | 73/645 |
| 2014/0235945 A1* | 8/2014 | McDowall | 600/111 |
| 2014/0331875 A1* | 11/2014 | Frye et al. | 101/170 |
| 2015/0003584 A1* | 1/2015 | Weisfield et al. | 378/62 |

OTHER PUBLICATIONS

Tocci, Michael D. et al.; A Versatile HDR Video Production System; ACM Transactions on Graphics (TOG)—Proceedings of ACM SIGGRAPH 2011, vol. 30 Issue 4; Jul. 2011.

Kiser, Chris et al.; Real Time Automated Tone Mapping System for HDR Video; IEEE International Conference on Image Processing; Sep. 30-Oct. 3, 2012.

Ellerbroek, B. L. et al.; Inverse Problems in Astronomical Adaptive Optics; (Topical Review Article), Inverse Problems, 063001, vol. 25, No. 6; Jun. 2009.

Rice University; Diffraction and Fourier Optics; Jul. 2011, available online at http://www.owlnet.rice.edu/~dodds/Files332/fourier.pdf.

* cited by examiner

SINGLE IMAGE ACQUISITION HIGH DYNAMIC RANGE CAMERA BY DISTORTED IMAGE RESTORATION

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 101438.

BACKGROUND OF THE INVENTION

The invention described herein relates generally to the field of high dynamic range (HDR) imaging. Previous attempts at creating HDR images have experienced short-comings related to the temporal disparity between multiple image captures, and the expense and complication associated with multiple imaging paths. The temporal proximity of multiple image captures is limited by the rate at which the images can be read out from the image sensor. Greater temporal disparity among captures increases the likelihood of motion existing among the captures, whether camera motion related to hand jitter, or scene motion resulting from objects moving within the scene. Motion increases the difficulty in merging multiple images into a single output image. The use of multiple imaging paths and sensors introduces a correspondence problem among the multiple images and thus generates images having different perspectives.

SUMMARY

Described herein is a method and camera for generating a high dynamic range (HDR) image. The method comprises the first step of receiving a first optical signal from a lens and generating a first output signal at a first image acquisition chip. The first image acquisition chip is coated with a first partial reflection coating. The second step provides for reflecting the first optical signal off the first partial reflection coating to create a second optical signal such that the second optical signal has a lower intensity than the first optical signal. The third step provides for receiving the second optical signal and generating a second output signal at a second image acquisition chip. The fourth step provides for combining the first and second output signals to create the HDR image.

The HDR camera may be described as comprising a lens, first and second image acquisition chips, and a processor. The first image acquisition chip is positioned to receive a first optical signal from the lens and configured to generate a first output signal in response to receiving the first optical signal. Also, the first image acquisition chip is coated with a first partial reflection coating such that an intensity-reduced portion of the first optical signal is reflected off the first partial reflection coating to create a second optical signal. The second image acquisition chip is positioned to receive the second optical signal and configured to generate a second output signal in response to receiving the second optical signal. The processor is configured to combine the first and second output signals to create an HDR image.

Alternatively, the HDR camera may be described as comprising a lens, first and second image acquisition chips, and a processor. The first image acquisition chip is positioned to receive a first optical signal from the lens. The first image acquisition chip is coated with a first partial reflection coating such that a first portion of the first optical signal is transmitted through the first partial reflection coating and a second portion of the first optical signal is reflected off the first partial reflection coating to create a second optical signal. The first image acquisition chip is configured to generate a first output signal in response to receiving the first portion of the first optical signal. The second image acquisition chip is positioned to receive the second optical signal and configured to generate a second output signal in response to receiving the second optical signal. The processor is operatively coupled to receive the first and second output signals and configured to combine the first and second output signals to create an HDR image.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1:
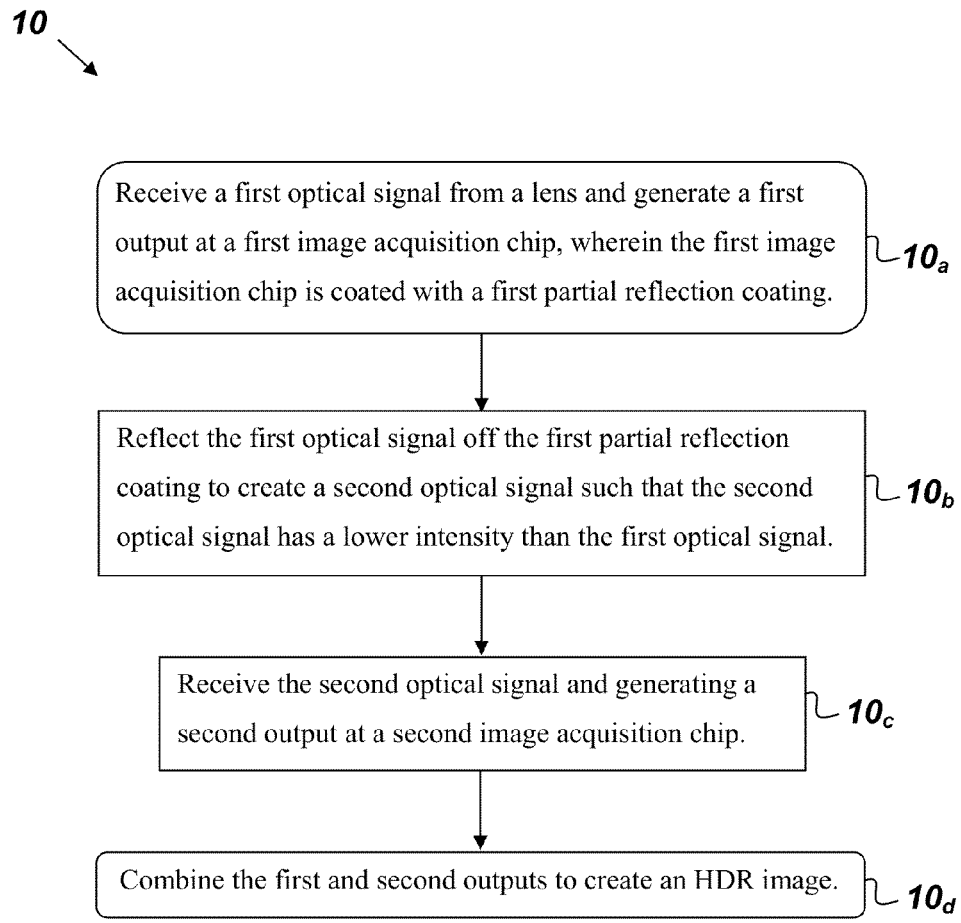
FIG. 1 is a flowchart depicting a high dynamic range image generation method.

Described herein is a method 10 for generating a high dynamic range (HDR) image. Generally, method 10 may be described as a process for multiplexing a live image into multiple images with different light-exposure levels with no time delay between images. FIG. 1 is a flowchart depicting the HDR image generation method 10 comprising, consisting of, or consisting essentially of the following four steps. The first step $10_a$ provides for receiving a first optical signal from a lens and generating a first output signal at a first image acquisition chip that is coated with a partial reflection coating. The second step $10_b$ provides for reflecting the first optical signal off the first image acquisition chip to create a second optical signal such that the second optical signal has a lower intensity than the first optical signal. The third step $10_c$ provides for receiving the second optical signal and generating a second output signal at a second image acquisition chip. The fourth step $10_d$ provides for combining the first and second output signals to create the HDR image. The HDR image created by method 10 may be a digital photograph or even real-time video.

Figure 2:
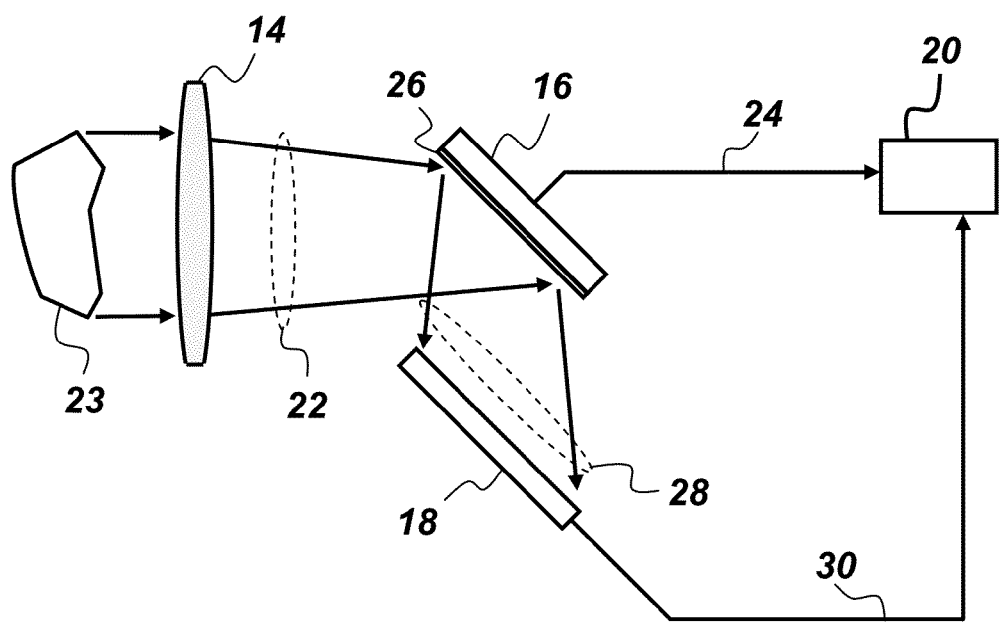
FIG. 2 is an illustration of an embodiment of a high dynamic range camera.

FIG. 2 is an illustration of an embodiment of a camera 12 that may be used to practice method 10. Camera 12 comprises, consists of, or consists essentially of a lens 14, first and second image acquisition chips 16 and 18 respectively, and a processor 20. The first image acquisition chip 16 is positioned with respect to lens 14 so as to receive a first optical signal 22 from the lens 14. The first optical signal 22 comprises light rays from an object 23. The first image acquisition chip 16 is also configured to generate, and send to the processor 20, a first output signal 24 in response to receiving the first optical signal 22. The first image acquisition chip 16 is coated with a first partial reflection coating 26 such that an intensity-reduced portion of the first optical signal 22 is reflected off the first image acquisition chip 16 to create a second optical signal 28. Thus, a portion of the first optical signal 22 is transmitted through the first partial reflection coating 26 to the first image acquisition chip 16 and another portion of the first optical signal 22 is reflected off the first partial reflection coating 26. The second image acquisition chip 18 is positioned with respect to the first image acquisition chip 16 to receive the second optical signal 28. The second image acquisition chip 18 is configured to generate, and send to the processor 20, a second output signal 30 in response to receiving the second optical signal 28. The processor 20 is configured to combine the first and second output signals 24 and 30 to create an HDR image representing the object 23. The object 23 may be anything of which a photograph or video may be taken.

The lens 14 may be any optical device capable of transmitting and/or refracting light. The lens may be a simple lens with a single optical element or a compound lens having an array of optical elements with a common axis. Suitable examples of the lens include, but are not limited to, spherical, convex, concave, and planar. The first and second image acquisition chips 16 and 18, and all other image acquisition chips described herein, may be any device capable of converting an optical signal into an output signal that can be communicated to the processor 20. Suitable examples for each of the first and second image acquisition chips 16 and 18 include, but are not limited to a charge-coupled device (CCD), a complementary metal-oxide-semiconductor (CMOS), and Lytro®'s light field sensor that incorporates a micro-lens array.

The processor 20 may be any device capable of combining the first and second output signals 24 and 30 into an HDR image. Accordingly, the processor 20 is in communication with the first and second image acquisition chips 16 and 18. The processor 20 may comprise electrical circuitry and software for merging the first and second output signals 24 and 30, and additional signals into an HDR image. The processor 20 may be internal or external to the camera 12. The processor 20 may be configured to run any suitable image processing software. Suitable image processing software is known and commercially available. Examples include HDR software packages available from Nikon® and Canon®, such as Canon®'s Digital Photo Professional software. Included within the suitable software packages is software that utilizes a bilateral filter algorithm, such as is described in Kuang et al., "Evaluating HDR Rendering Algorithms", *ACM Transactions on Applied Perception*, Vol. 4, Issue 2, July 2007.

The processor 20 may be operatively coupled to a non-transitory computer-readable medium. The non-transitory computer-readable medium has computer-readable instructions stored thereon that, when executed by the processor 20, cause the camera 12 to: allow the first and second image acquisition chips 16 and 18 to receive the first and second optical signals 22 and 28 respectively; receive the first and second output signals 24 and 30 at the processor 20 and merging, with the processor 20, the image data from the first and second output signals 24 and 30 into a single image having an increased dynamic range relative to that of the lower dynamic range images from which it is produced. The image data may be transferred in various formats, including raw and Joint Photographic Experts Group (JPEG) formats.

The first partial reflection coating 26, and all other partial reflection coatings described herein, may consist of any substance that will allow a portion of an optical signal to pass through the coating while simultaneously reflecting a portion of the optical signal. The first partial reflection coating 26, and all other partial reflection coatings described herein, may be deposited directly onto a corresponding image acquisition chip such as by chemical vapor deposition, or each partial reflection coating may be a separate optical device, optically coupled to its corresponding image acquisition chip. The first partial reflection coating 26, and all other partial reflection coatings described herein, may be any desired thickness. Suitable examples of a partial reflection coating include, but are not limited to, a neutral density filter, clear glass, and shaded glass.

Method 10 is able to simultaneously capture multiple images at different exposure levels with no time delay between images. Diffraction theory, Geometrical Optics, aberration theory and Digital Image Processing may be applied to multiplex a live image into multiple images with different exposure levels. Diffraction theory suggests that the relationship between an image and its focal point may be described by a two-dimensional (2D) fast Fourier transform (FFT). In other words, the focal point of an image is equal to the 2D FFT of the image. Aberrations are imperfections of the image. All imaging systems will have some degree of aberration. If the aberration is known, then the aberration may be filtered from the output signal according to known image processing techniques.

Figure 3:
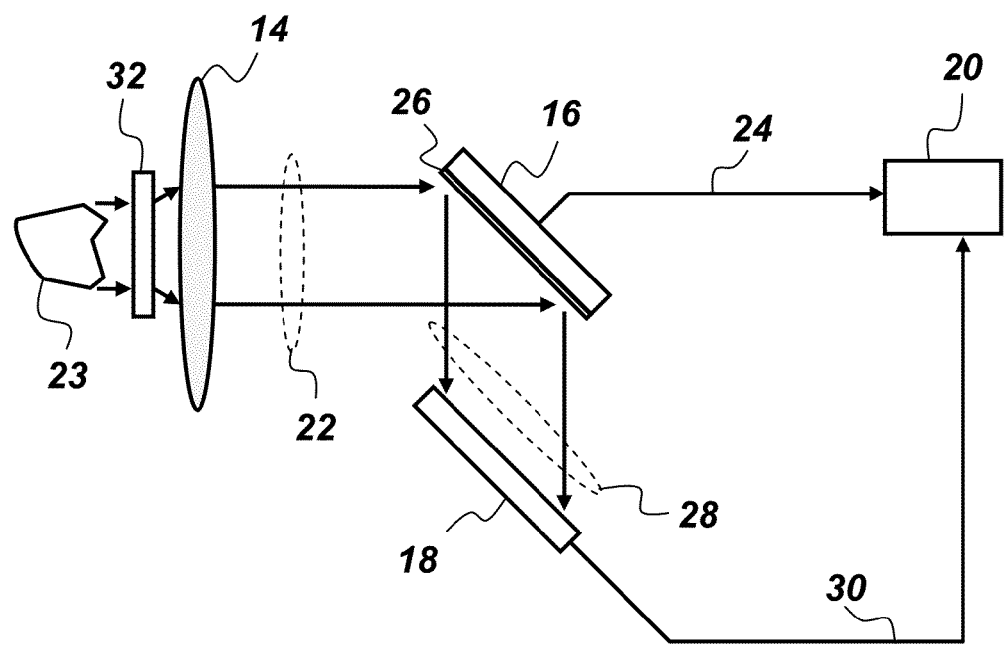
FIG. 3 is an illustration of another embodiment of a high dynamic range camera.

FIG. 3 is an illustration of another embodiment of the camera 12 which further comprises a depth of focus (DOF) increaser 32. The DOF increaser 32 is positioned with respect to the lens 14 and the first image acquisition chip 16 such that the DOF is increased to the point that the first optical signal 22 is substantially collimated at the point of incidence on the first partial reflection coating 26. As used herein, the term "substantially collimated" means that the divergence of the first optical signal 22 is no more than 2 degrees. The DOF increaser 32 may be any optical device capable of increasing the depth of focus of the camera 12. Suitable examples of the DOF increaser 32 include, but are not limited to, a spatial light modulator (SLM), a phase-shift mask, and a cubic phase-shift mask. The DOF increaser 32 may be in contact with, or nearly touching, the lens 14. A suitable example of the DOF increaser 32 is, but is not limited to, a zero-twist nematic liquid-crystal SLM. The DOF increaser 32 is configured to increase the DOF of the first optical signal 22. The DOF increaser 32 may be positioned with respect to the lens 14 and the first partial reflection coating 26 such that the first and second output signals 24 and 30 comprise the same distorted image—differing only in their respective intensity levels. The DOF increaser 32 may optionally be communicatively coupled to the processor 20.

Figure 4:
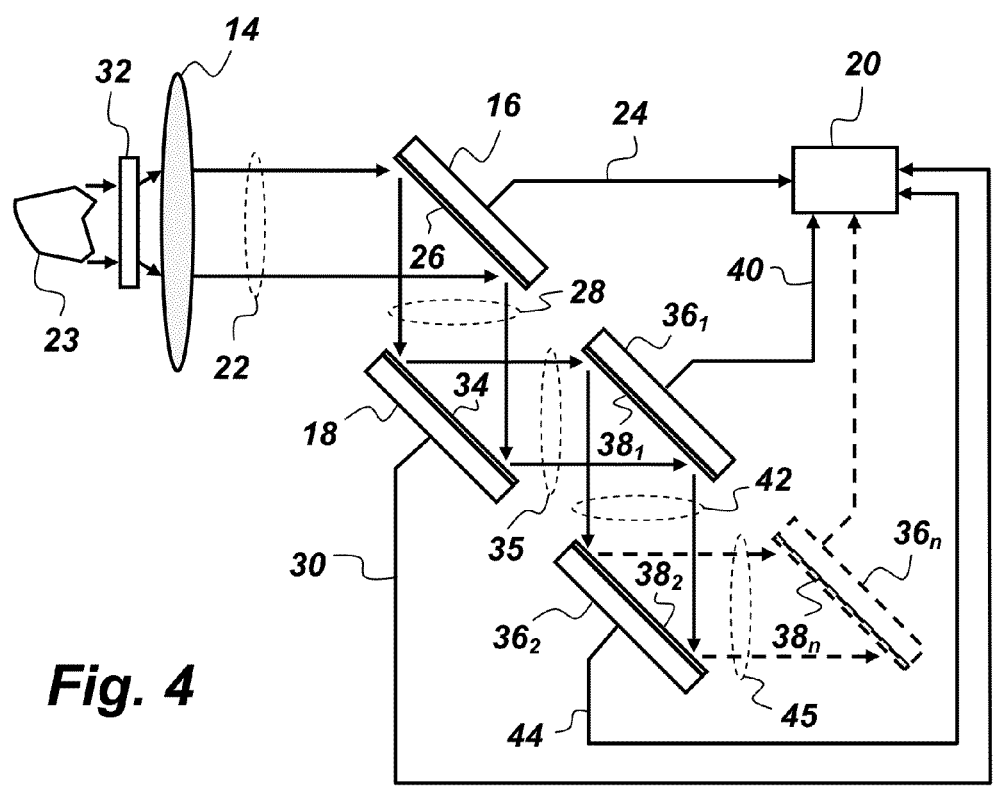
FIG. 4 is an illustration of another embodiment of a high dynamic range camera.

FIG. 4 is an illustration of an embodiment of camera 12 wherein the second image acquisition chip 18 is coated with a second partial reflection coating 34. A portion of the second optical signal 28 is reflected off the second partial reflection coating 34 to create a third optical signal 35 that has a lower intensity than the second optical signal 28. The embodiment of the camera 12 shown in FIG. 4 also comprises additional image acquisition chips $36_1$ to $36_n$, where n is an index. Each additional image acquisition chip 36 is coated with an additional partial reflection coating $38_1$ to $38_n$ and is communicatively coupled with the processor 20. The partial reflection coating $38_n$ on the last image acquisition chip $36_n$ is optional. The optical properties of each partial reflection coating may differ from chip to chip. The additional image acquisition chip $36_1$ is positioned to receive a portion of the third optical signal 35 that is transmitted through the partial reflection coating $38_1$. The additional image acquisition chip $36_1$ is configured to generate, and send to the processor 20, a third output signal 40 upon receiving the portion of the third optical signal 35 that is transmitted through the partial reflection coating $38_1$. Another portion of the third optical signal 35 is reflected off the partial reflection coating $38_1$ to create a fourth optical signal 42 that has a lower intensity than the third optical signal 35.

In like manner, the additional image acquisition chip $36_2$ is positioned to receive a portion of the fourth optical signal 42 that is transmitted through the partial reflection coating $38_2$. The additional image acquisition chip $36_2$ is configured to generate, and send to the processor 20, a fourth output signal 44 upon receiving the portion of the fourth optical signal 42 that is transmitted through the partial reflection coating $38_2$. Another portion of the fourth optical signal 42 is reflected off the partial reflection coating $38_2$ to create a fifth optical signal 45 that has a lower intensity than the fourth optical signal 42. This arrangement and process is repeated for each of the n additional image acquisition chips and partial reflection coatings. The camera 12 may have any desired number of additional image acquisition chips 36.

With multiple image acquisition chips, each with its own partial reflection coating (with the exception of the last image acquisition chip in the optical chain where the partial reflection coating is optional), the image of object 23 is focused in the center of each acquisition chip of camera 12, while the rest of each chip will experience misfocus aberration and astigmatism. The misfocus aberration and astigmatism can be corrected by using fractional Fourier transform algorithms as is known in the art. An example of using fractional Fourier transform algorithms to correct for misfocus aberration may be found in U.S. Pat. No. 6,687,418 issued to Lester F. Ludwig, which is incorporated herein by reference. The same algorithms may be applied by the processor 20 to the output signals from each of the image acquisition chips to reconstruct and/or restore the respective images in each output signal. The processor 20 is configured to combine n output signals to create the HDR image.

Figure 5:
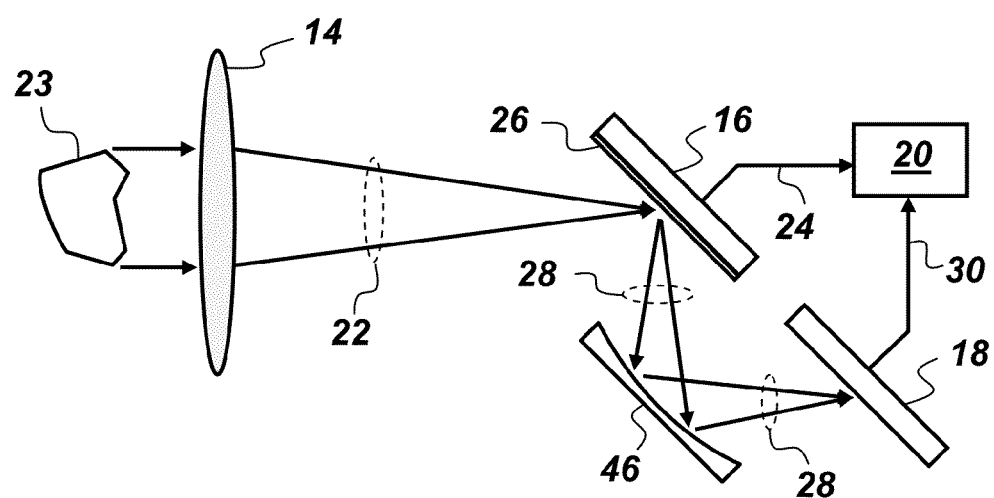
FIG. 5 is an illustration of another embodiment of a high dynamic range camera

FIG. 5 is an illustration of an embodiment of the camera 12 where the second optical signal 28 is reflected off a first parabolic mirror 46 such that the second optical signal 28 is refocused at the point of incidence with the second image acquisition chip 18. In this embodiment, the lens 14 focuses the first optical signal 22 on the first image acquisition sensor 16 where the first optical signal 22 is reflected off the partial reflective coating 26. After being reflected off the partial reflective coating 26, the second optical signal 28 will begin to diverge. The diverging second optical signal 28 is received/reflected by the first parabolic mirror 46 such that the second optical signal 28 is re-focused onto the second image acquisition chip 18.

Figure 6:
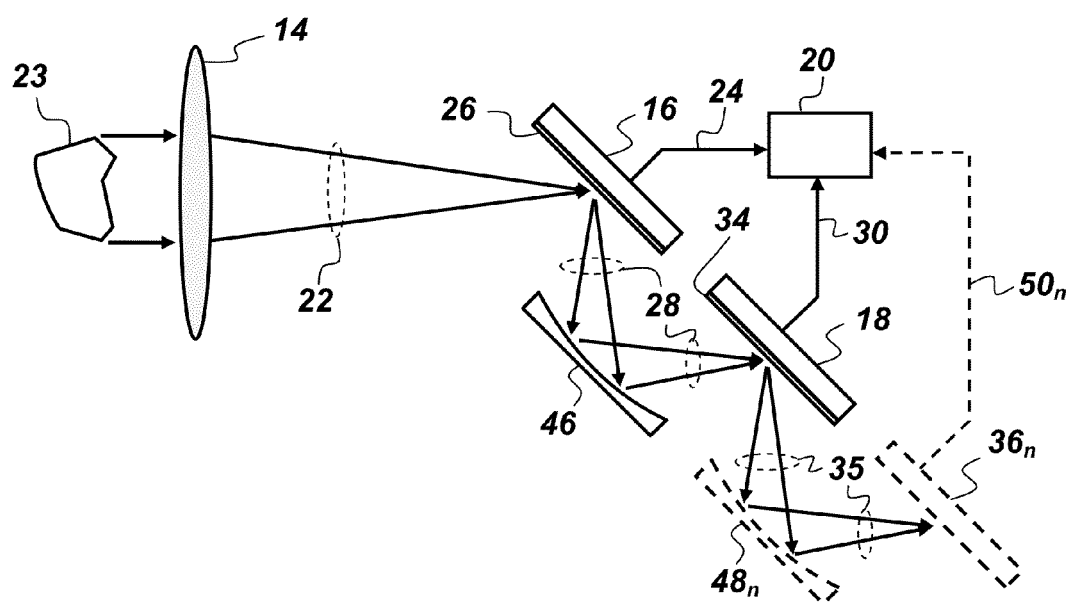
FIG. 6 is an illustration of another embodiment of a high dynamic range camera.

FIG. 6 is an illustration of an embodiment of the camera 12 comprising an additional parabolic mirror $48_n$ and the additional image acquisition chip $36_n$. In this embodiment, the second image acquisition chip 18 is coated with the second partial reflection coating 34 and is positioned with respect to the first parabolic mirror 46 such that the second optical signal 28 is reflected off the second partial reflection coating 34 to create the third optical signal 35. The third optical signal 35 is then reflected off the additional parabolic mirror 48, and received at the additional image acquisition chip $36_n$. The additional image acquisition chip $36_n$ is configured to generate an additional output signal 50, upon receiving the third optical signal 35. All the output signals are sent to the processor 20 where they are combined to create the HDR image. Any desired number of additional image acquisition chips 36 may be used with this embodiment of the camera 12.

From the above description of method 10 and camera 12, it is manifest that various techniques may be used for implementing the concepts of method 10 and camera 12. The described embodiments are to be considered in all respects as illustrative and not restrictive. Further, the method and apparatus disclosed herein may be practiced in the absence of any element that is not specifically claimed and/or disclosed herein. For example, the method 10 may be practiced without the use of beam splitters. It should also be understood that method 10 and camera 12 are not limited to the particular embodiments described herein, but are capable of many embodiments without departing from the scope of the claims.

We claim:

1. A method for generating a high dynamic range (HDR) image comprising the following steps:
   a. receiving a first optical signal from a lens and generating a first output signal at a first image acquisition chip, wherein the first image acquisition chip is coated with a first partial reflection coating;
   b. reflecting the first optical signal off the first partial reflection coating to create a second optical signal such that the second optical signal has a lower intensity than the first optical signal;
   c. receiving the second optical signal and generating a second output signal at a second image acquisition chip; and
   d. combining the first and second output signals with a processor to create the HDR image.

2. The method of claim 1, further comprising the step of increasing the depth of focus with a spatial light modulator (SLM) such that the first optical signal is substantially collimated at the point of incidence on the first image acquisition chip.

3. The method of claim 2, wherein the second image acquisition chip is coated with a second partial reflection coating and further comprising the steps of:
   e. reflecting the second optical signal off the second partial reflection coating to create a third optical signal such that the third optical signal has a lower intensity than the second optical signal;
   f. receiving the third optical signal and generating a third output signal at a third image acquisition chip; and
   g. combining the first, second, and third output signals with the processor to create the HDR image.

4. The method of claim 3, further comprising the step of running the same image reconstruction algorithms with the processor on each of the first, second, and third output signals to correct for misfocus aberration and astigmatism.

5. The method of claim 1, further comprising the step of reflecting the second optical signal off of a parabolic mirror such that the second optical signal is refocused at the point of incidence with the second image acquisition chip.

6. The method of claim 5, wherein the second image acquisition chip is coated with a second partial reflection coating and further comprising the steps of:
   h. reflecting the second optical signal off the second partial reflection coating to create a third optical signal such that the third optical signal has a lower intensity than the second optical signal;
   i. receiving the third optical signal and generating a third output signal at a third image acquisition chip; and
   j. combining with the processor the first, second, and third output signals to create the HDR image.

7. The method of claim 1, wherein the HDR image is a digital photograph.

8. The method of claim 1, further comprising repeating steps (a) through (d) to create a real-time HDR video.

9. The method of claim 1, wherein none of the optical signals are passed through beam splitters.

10. The method of claim 1, further comprising the step of increasing the depth of focus between the lens and the first image acquisition chip with a phase-shift mask such that the first and second output signals comprise the same distorted image—differing only in their respective intensity levels.

11. The method of claim 10, further comprising the step of running on the processor the same image reconstruction algorithms on each of the first and second output signals to correct the distorted images.

12. A high dynamic range (HDR) camera comprising:
a lens;
a first image acquisition chip positioned to receive a first optical signal from the lens and configured to generate a first output signal in response to receiving the first optical signal, wherein the first image acquisition chip is coated with a first partial reflection coating such that an intensity-reduced portion of the first optical signal is reflected off the first partial reflection coating to create a second optical signal;
a second image acquisition chip positioned to receive the second optical signal and configured to generate a second output signal in response to receiving the second optical signal; and
a processor operatively coupled to receive the first and second output signals and configured to combine the first and second output signals to create an HDR image.

13. The camera of claim 12, further comprising a depth-of-focus (DOF) increaser configured to increase the depth of focus such that the first optical signal is substantially collimated at the point of incidence on the first image acquisition chip.

14. The camera of claim 13, further comprising a third image acquisition chip positioned to receive a third optical signal from the second image acquisition chip and configured to generate a third output signal in response to receiving the third optical signal, wherein the second image acquisition chip is coated with a second partial reflection coating, and wherein the third optical signal is an intensity-reduced portion of the second optical signal reflected off the second partial reflection coating, and wherein the processor is configured to combine the first, second, and third output signals to create the HDR image.

15. The camera of claim 14, wherein the processor is configured to use the same image reconstruction algorithms on each of the first, second, and third output signals to correct for misfocus aberration and astigmatism.

16. The camera of claim 15, wherein the DOF increaser is a spatial light modulator.

17. The camera of claim 16, wherein the DOF increaser is a phase shift mask.

18. The camera of claim 12, further comprising a first parabolic mirror configured to refocus the second optical signal at the point of incidence with the second image acquisition chip.

19. The camera of claim 18, further comprising:
a third image acquisition chip, wherein the second image acquisition chip is coated with a second partial reflection coating such that an intensity-reduced portion of the second optical signal is reflected off the second partial reflection coating to create a third optical signal, and wherein third image acquisition chip is configured to generate a third output signal in response to receiving the third optical signal; and
a second parabolic mirror configured to refocus the third optical signal at the point of incidence with the third image acquisition chip, wherein the processor is configured to combine the first, second, and third output signals to create the HDR image.

20. A high dynamic range (HDR) camera comprising:
a lens;
a first image acquisition chip positioned to receive a first optical signal from the lens, wherein the first image acquisition chip is coated with a first partial reflection coating such that a first portion of the first optical signal is transmitted through the first partial reflection coating and a second portion of the first optical signal is reflected off the first partial reflection coating to create a second optical signal, wherein the first image acquisition chip is configured to generate a first output signal in response to receiving the first portion of the first optical signal;
a second image acquisition chip positioned to receive the second optical signal and configured to generate a second output signal in response to receiving the second optical signal; and
a processor operatively coupled to receive the first and second output signals and configured to combine the first and second output signals to create an HDR image.

* * * * *